(12) United States Patent
Ryan

(10) Patent No.: US 9,564,796 B1
(45) Date of Patent: Feb. 7, 2017

(54) POWER CIRCUIT WITH OVERVOLTAGE PROTECTION

(71) Applicant: Western Digital Technologies, Inc., Irvine, CA (US)

(72) Inventor: Robert P. Ryan, Mission Viejo, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 462 days.

(21) Appl. No.: 14/164,041

(22) Filed: Jan. 24, 2014

Related U.S. Application Data

(60) Provisional application No. 61/927,889, filed on Jan. 15, 2014.

(51) Int. Cl.
*H02M 1/32* (2007.01)

(52) U.S. Cl.
CPC ..................................... *H02M 1/32* (2013.01)

(58) Field of Classification Search
CPC ....................................................... H02M 1/32
USPC .......................................................... 361/18
See application file for complete search history.

(56) References Cited

U.S. PATENT DOCUMENTS

| | | | |
|---|---|---|---|
| 4,400,711 A | 8/1983 | Avery | |
| 4,484,244 A | 11/1984 | Avery | |
| 4,513,341 A | 4/1985 | Kollanyi | |
| 5,272,392 A | 12/1993 | Wong et al. | |
| 5,293,082 A | 3/1994 | Bathaee | |
| 5,781,390 A | 7/1998 | Notaro et al. | |
| 5,793,596 A * | 8/1998 | Jordan | H02H 3/025 361/18 |
| 5,930,096 A | 7/1999 | Kim | |
| 6,728,084 B2 | 4/2004 | Ziemer et al. | |
| 6,791,394 B2 | 9/2004 | Deboes et al. | |
| 6,934,135 B1 | 8/2005 | Ryan | |
| 7,154,725 B2 | 12/2006 | Chloupek et al. | |
| 7,352,159 B2 | 4/2008 | Luo et al. | |
| 7,369,350 B2 | 5/2008 | Yang | |
| 7,672,102 B2 | 3/2010 | Kemper | |
| 7,733,712 B1 | 6/2010 | Walston et al. | |
| 7,742,266 B2 | 6/2010 | Chen et al. | |
| 8,203,815 B2 | 6/2012 | Kilroy et al. | |
| 2005/0225912 A1 | 10/2005 | Pant et al. | |
| 2005/0286194 A1 | 12/2005 | Fujiki et al. | |
| 2008/0055797 A1* | 3/2008 | Wardzala | H02H 9/042 361/18 |
| 2009/0073619 A1 | 3/2009 | Chen et al. | |
| 2011/0188146 A1 | 8/2011 | Oh et al. | |
| 2011/0266982 A1 | 11/2011 | Rollman | |
| 2012/0194953 A1 | 8/2012 | Mikolajczak | |

(Continued)

*Primary Examiner* — Thienvu Tran
*Assistant Examiner* — Kevin J Comber

(57) ABSTRACT

Power circuitry is disclosed for protecting an electronic device during an overvoltage event. A voltage clamp is connected in parallel with a charge pump, wherein the voltage clamp limits an input voltage of the charge pump. A current limiting resistor couples a supply voltage to the voltage clamp and to the charge pump. A power transistor couples the supply voltage to a load, wherein a gate of the power transistor is controlled by an output of the charge pump during a power-on operation. When the supply voltage exceeds a threshold thereby activating the voltage clamp, the current limiting resistor limits a current flowing through the voltage clamp.

30 Claims, 5 Drawing Sheets

(56) References Cited

U.S. PATENT DOCUMENTS

2012/0286756 A1  11/2012  Tsukiji et al.

* cited by examiner

POWER CIRCUIT WITH OVERVOLTAGE PROTECTION

CROSS REFERENCE TO RELATED APPLICATION(S)

This application claims the benefit of U.S. Provisional Application No. 61/927,889, filed on Jan. 15, 2014, which is hereby incorporated by reference in its entirety.

BACKGROUND

The circuitry for electronic devices, such as consumer electronics, is typically fabricated in silicon in one or more integrated circuits (ICs). The ICs are typically powered by a DC supply voltage which may be generated internally by the electronic device using an AC/DC converter, or generated externally, such as by a host of the electronic device, or using a plug-in AC/DC adapter. The ICs are typically fabricated to withstand a specified maximum DC supply voltage above which the ICs may be damaged typically from overheating. To protect against an overvoltage event, the prior art has employed a power transistor (e.g., a power FET) connected in series with the supply voltage and the ICs, including control circuitry for controlling the gate of the power transistor in order to turn-off the transistor and disconnect the supply voltage from the ICs, or regulate the power transistor to limit the maximum supply voltage applied to the ICs. However, the gate control circuitry for the power transistor is typically powered by the supply voltage and therefore subject to damage from overheating during an overvoltage event. If the gate control circuitry is damaged due to an overvoltage event, it is effectively the same as blowing a fuse since the power transistor remains off. Although blowing a fuse may protect the rest of the IC circuitry, as well as prevent the electronic device from catching fire, it also disables the device until the gate control circuitry can be repaired or replaced.

DETAILED DESCRIPTION

Figure 1:
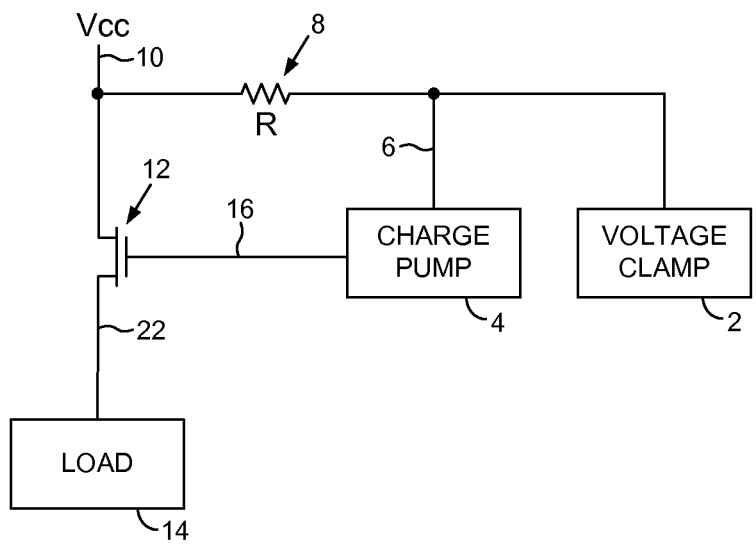
FIG. 1 shows power circuitry according to an embodiment for protecting an electronic device during an overvoltage event by limiting a voltage applied to a charge pump that controls a gate of a power transistor for coupling a supply voltage to a load.

FIG. 1 shows power circuitry according to an embodiment configured to protect an electronic device during an overvoltage event. A voltage clamp 2 is connected in parallel with a charge pump 4, wherein the voltage clamp 2 limits an input voltage 6 of the charge pump 4. A current limiting resistor 8 couples a supply voltage 10 to the voltage clamp 2 and to the charge pump 4. A power transistor 12 couples the supply voltage 10 to a load 14, wherein a gate 16 of the power transistor 12 is controlled by an output of the charge pump 4 during a power-on operation. When the supply voltage 10 exceeds a threshold thereby activating the voltage clamp 2, the current limiting resistor 8 limits a current flowing through the voltage clamp 2.

In one embodiment, the voltage clamp 2, charge pump 4 and the load 14 are fabricated in an integrated circuit (IC) that may be damaged if the supply voltage powering the IC exceeds a threshold. The various components shown in the embodiment of FIG. 1 protect the IC by essentially isolating the components from the supply voltage 10 during an overvoltage event. For example, the load 14 is protected by controlling the gate 16 of the power transistor in order to limit the maximum voltage applied to the load 14. During a power-on operation, the voltage clamp 2 limits the input voltage 6 of the charge pump 4, thereby protecting the charge pump 4 during an overvoltage event, and the current limiting resistor 8 protects the voltage clamp 2 by limiting the current flowing through the voltage clamp 2 during an overvoltage event. Accordingly, in one embodiment only the discrete components (power transistor 12 and current limiting resistor 8) are exposed to a high supply voltage 10 during an overvoltage event whereas the IC components are isolated from the high supply voltage 10.

Figure 2:
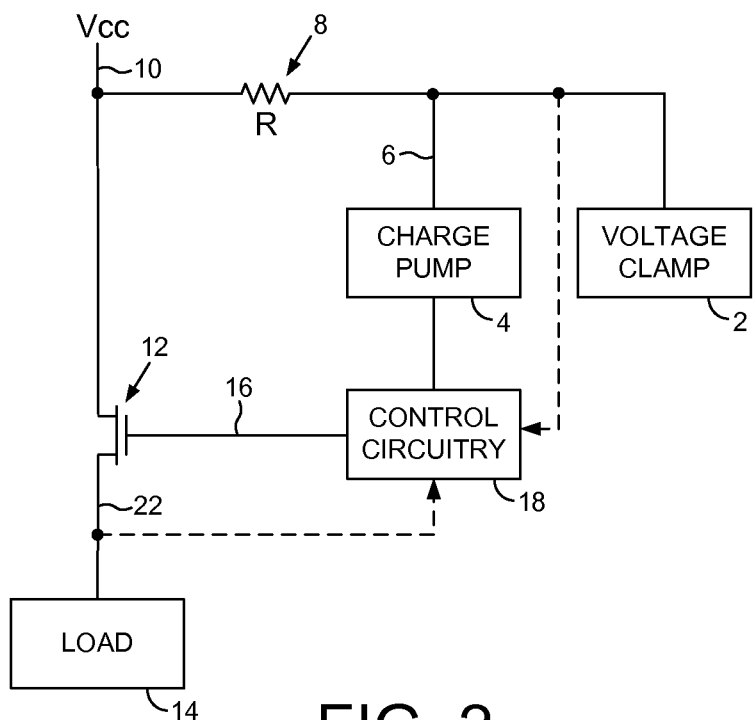
FIG. 2 shows power circuitry according to an embodiment wherein control circuitry powered by the charge pump controls the gate of the power transistor.

In one embodiment, the gate 16 of the power transistor 12 may be controlled passively in response to the output of the charge pump 4 (e.g., using a capacitor for ramping the gate voltage). In another embodiment shown in FIG. 2, the gate 16 of the power transistor 12 is controlled actively using suitable control circuitry 18 that is powered by a startup voltage 20 output by the charge pump 2 at least during a power-on operation. In this embodiment, the power transistor 12 remains off during the power-on operation in order to isolate the load 14 from the supply voltage 10, thereby protecting the load 14 against a potential overvoltage event. A small amount of current is applied to the charge pump 4 by the supply voltage 10 (through the current limiting resistor 8) which in turn provides the startup voltage 20 to the control circuitry 18. When the startup voltage 20 reaches a level sufficient to enable operation of the control circuitry 18, the control circuitry 18 begins controlling the gate 16 of the power transistor 12 to at least partially apply the supply voltage 10 to the load 14. In one embodiment, the control circuitry 18 may monitor the input voltage 6 of the charge pump 4 and/or the input voltage 22 applied to the load 14 by the power transistor 12 in order to detect an overvoltage event. If an overvoltage event is detected, the control circuitry 18 may control the gate 16 of the power transistor 12 in order to limit the input voltage 22 applied to the load 14. That is, during an overvoltage event the control circuitry 18 may operate the power transistor 12 as a voltage regulator so as to regulate the input voltage 22 applied to the load 14, thereby enabling normal operation of the load 14 during an overvoltage event rather than disrupt operation of the load 14.

Figure 3:
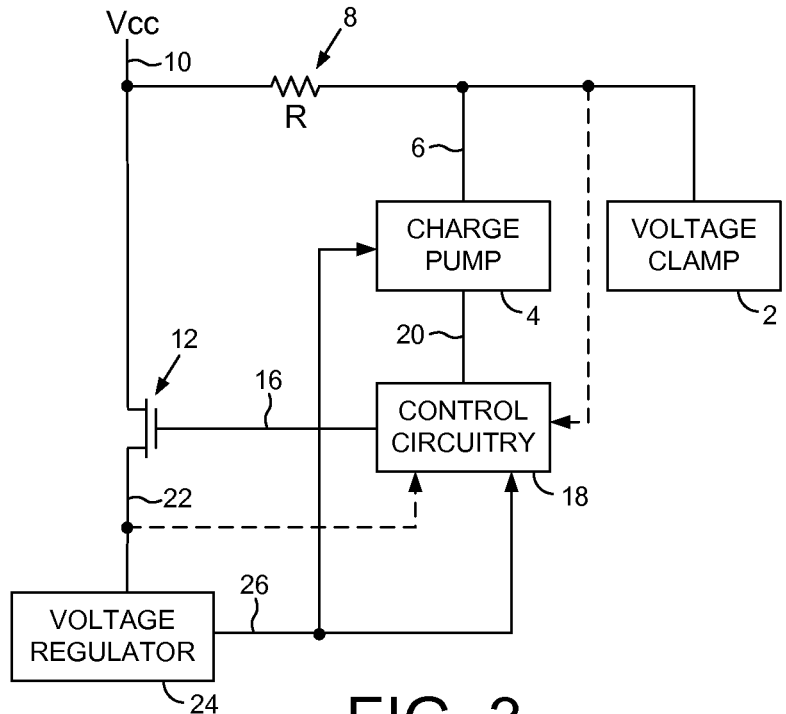
FIG. 3 shows an embodiment wherein the load comprises a voltage regulator.

FIG. 3 shows power circuitry according to an embodiment wherein the load comprises a voltage regulator 24 configured to generate one or more regulated voltages used to power the components of the electronic device. The voltage regulator 24 may, for example, up-convert the supply voltage 10 into a higher voltage, or down-convert the supply voltage 10 into a lower voltage. In the embodiment of FIG. 3, the voltage regulator 24 generates a regulated voltage 26 configured to power at least the charge pump 4 and the control circuitry 18. For example, during a power-on operation the charge pump 4 may be powered by the current flowing from the supply voltage 10 through the current limiting resistor 8. When the charge pump 4 supplies a high enough startup voltage 20 to enable operation of the control circuitry 18, the control circuitry 18 begins to turn on the power transistor 12 thereby supplying current to the voltage regulator 24 from the supply voltage 10. Once enough current is supplied to enable the voltage regulator 24 to begin generating the regulated voltage 26, the regulated voltage 26 supplies additional current to the charge pump 4, thereby increasing the slew rate of the startup voltage 20 and decreasing the startup time of the electronic device.

Figure 4:
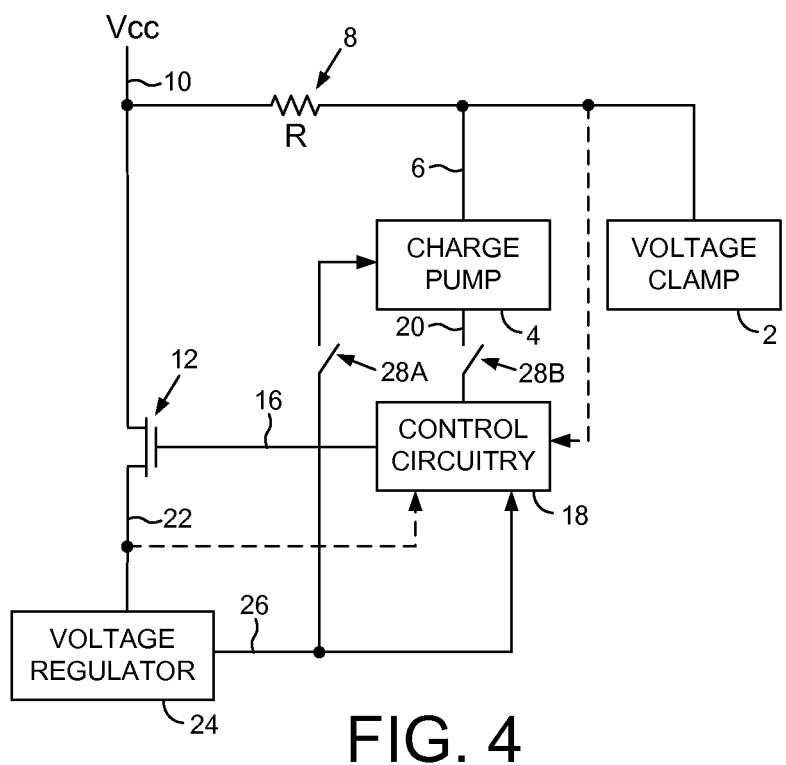
FIG. 4 shows an embodiment wherein during normal operation the voltage regulator powers the control circuitry and the charge pump is disabled.

FIG. 4 shows power circuitry according to an embodiment wherein once the voltage regulator 24 is operating normally after the power-on operation, the control circuitry 18 disables the charge pump 4 (e.g., by opening switches 28A and 28B) so the charge pump 4 consumes no power during normal operation of the electronic device. In an embodiment described below, the charge pump 4 may be re-enabled (e.g., by closing switches 28A and 28B) in order to perform a power-on reset during or after an overvoltage event.

Figure 5A:
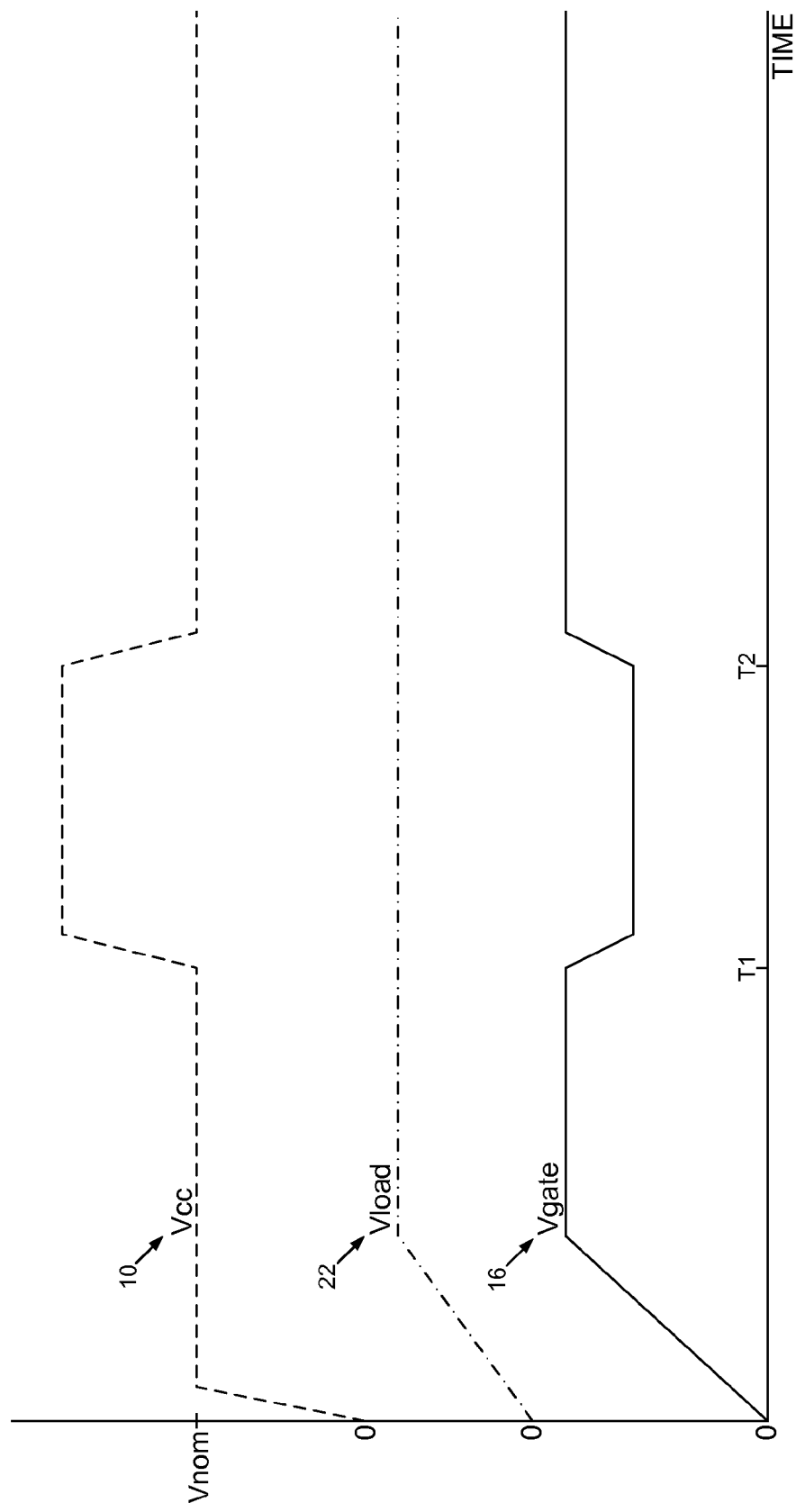
FIGS. 5A-5C show timing diagrams that illustrate different operating modes of the power circuitry relative to the supply voltage and an overvoltage event.

FIG. 5A shows a timing diagram that illustrates operation of the power circuitry according to an embodiment wherein when the electronic device is powered on, the supply voltage 10 quickly ramps from zero to a nominal level. The voltage applied to the gate 16 of the power transistor is ramped at a suitable slew rate using, for example, a passive capacitor or by the control circuitry 18. As the voltage applied to the gate 16 ramps higher, there is a corresponding ramping of the input voltage 22 applied to the load 14 as the current begins flowing through the power transistor 12. At time T1, the supply voltage 10 exceeds a threshold due to an overvoltage event, thereby activating the voltage clamp 2 to protect the charge pump 4. In response to detecting the overvoltage event, the control circuitry 18 reduces the voltage applied to the gate 16 of the power transistor 12, thereby maintaining the input voltage 22 applied to the load 14 at a substantially constant value (i.e., the power transistor 12 is controlled to regulate the input voltage 22 applied to the load 14). At time T2, the overvoltage event ends and the control circuitry 18 increases the voltage applied to the gate 16 of the power transistor 12 to a nominal level. In this embodiment, the input voltage 22 applied to the load 14 remains at a substantially nominal value which enables the electronic device to continue operating normally through an overvoltage event.

Figure 5B:
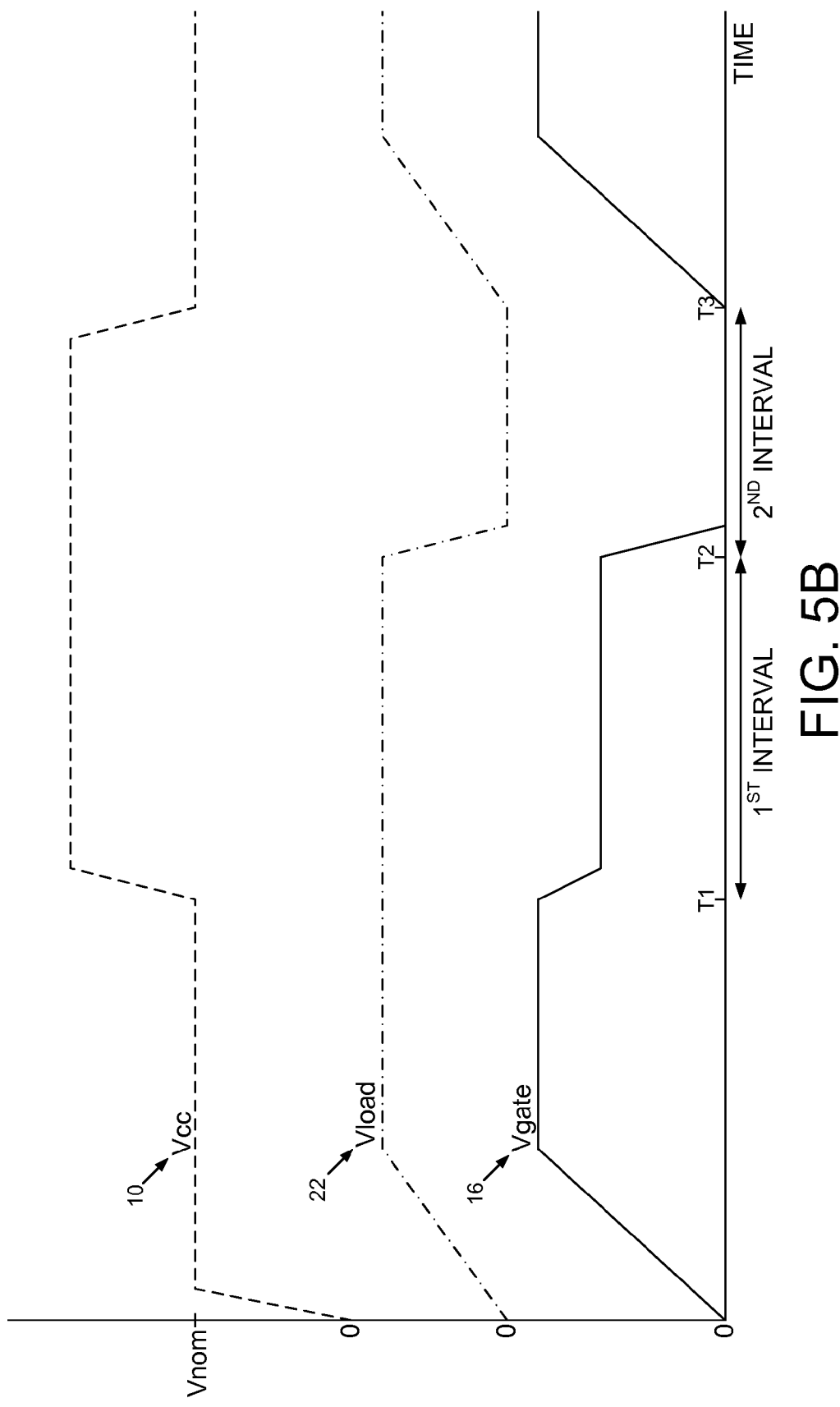

FIG. 5B shows a timing diagram that illustrates operation of the power circuitry according to an embodiment wherein when a duration of an overvoltage event exceeds a first interval, the control circuitry 18 controls the gate 16 of the power transistor 12 to substantially turn off the power transistor 12 to prevent the overvoltage event from damaging the power transistor 12. In one embodiment, the charge pump 4 may remain enabled during the overvoltage event so that the control circuitry 18 may remain powered by the startup voltage 20. When the control circuitry 18 detects the end of the overvoltage event (after a second interval), the control circuitry 18 ramps the voltage applied to the gate 16 of the power transistor 12 so as to ramp the input voltage 22 applied to the load 14 back to a nominal value.

Figure 5C:
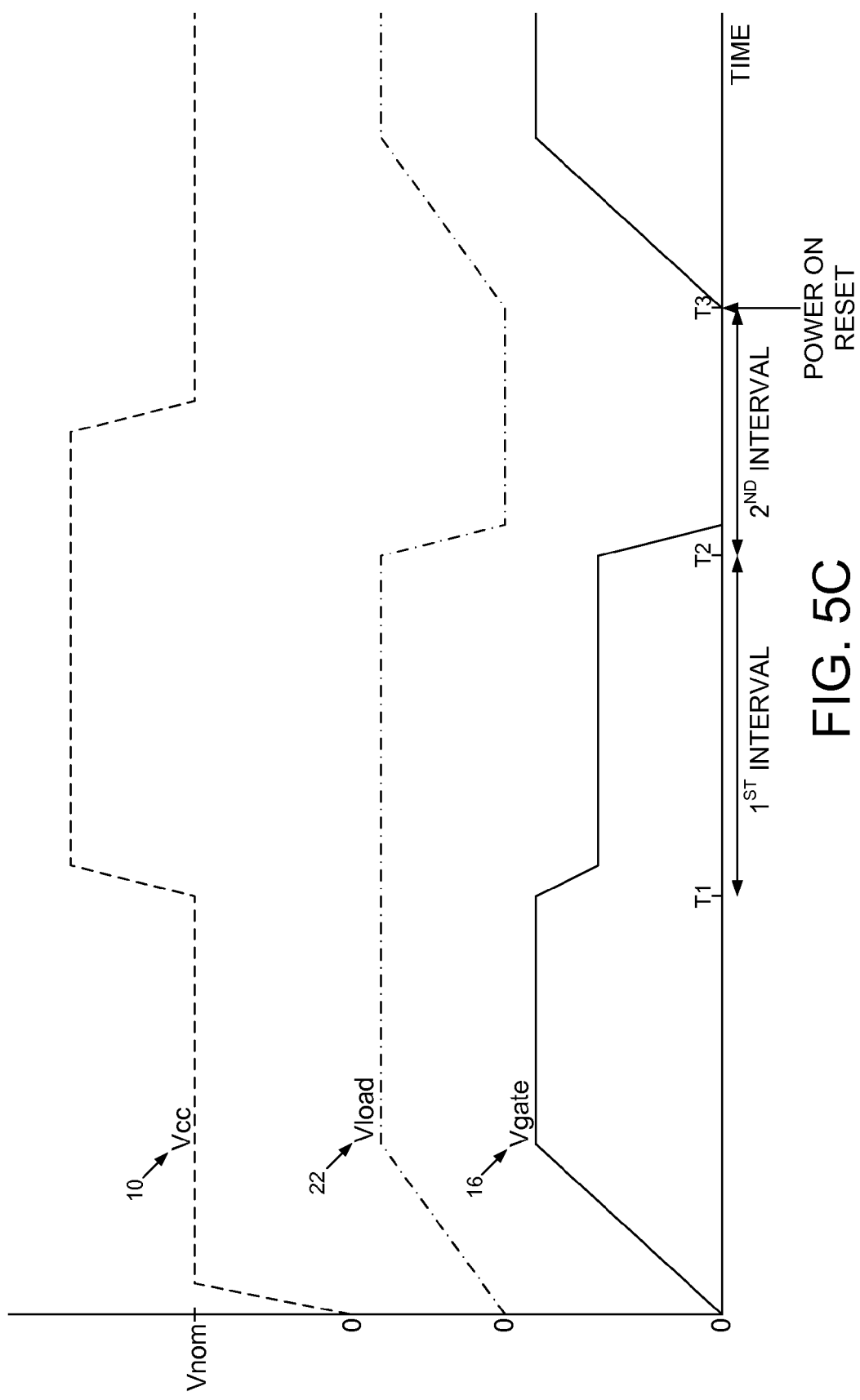

FIG. 5C shows a timing diagram that illustrates operation of the power circuitry according to an embodiment wherein when a duration of an overvoltage event exceeds a first interval, the control circuitry 18 controls the gate 16 of the power transistor 12 to substantially turn off the power transistor 12 to prevent the overvoltage event from damaging the power transistor 12. In this embodiment, the charge pump 4 may be disabled during normal operation (e.g., by opening switches 28A and 28B in FIG. 4) and may remain disabled for a predetermined second interval after an overvoltage event is detected. At the end of the second interval, the charge pump 4 may be enabled so that the power circuitry performs a power-on reset similar to the initial power-on operation described above. Although in the example of FIG. 5C the overvoltage event ends prior to the power-on reset, in one embodiment the overvoltage event may extend through the second interval and into the power-on reset operation. Accordingly, in one embodiment the power-on reset operations may be repeated a number of times until the overvoltage event subsides.

Any suitable control circuitry may be employed to implement the above embodiments, such as any suitable integrated circuit or circuits. In one embodiment, the control circuitry comprises a microprocessor executing instructions, the instructions being operable to cause the microprocessor to implement the embodiments described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. Power circuitry for protecting an electronic device during an overvoltage event, the power circuitry comprising:
    a voltage clamp in parallel with a charge pump, wherein the voltage clamp limits an input voltage of the charge pump;
    a current limiting resistor coupling a supply voltage to the voltage clamp and to the charge pump;
    a power transistor configured to couple the supply voltage to a load, wherein when the supply voltage exceeds a threshold thereby activating the voltage clamp, the current limiting resistor limits a current flowing through the voltage clamp; and control circuitry responsive to an output of the charge pump and configured to ramp a control voltage applied to a gate of the power transistor during a power-on operation.

2. The power circuitry as recited in claim 1, wherein the load comprises a voltage regulator.

3. The power circuitry as recited in claim 2, wherein after the power transistor at least partially turns on during the power-on operation, the voltage regulator generates a regulated voltage configured to power the charge pump.

4. The power circuitry as recited in claim 3, wherein the charge pump further turns on the power transistor in response to the regulated voltage.

5. The power circuitry as recited in claim 1, wherein the control circuitry is further configured to control the gate of the power transistor to limit a maximum voltage applied to the load when the supply voltage exceeds the threshold.

6. The power circuitry as recited in claim 5, wherein when the supply voltage exceeds the threshold for a first interval, the control circuitry is further configured to control the gate of the power transistor to substantially turn off the power transistor.

7. The power circuitry as recited in claim 6, wherein the gate of the power transistor is controlled to at least partially turn on the power transistor after a second interval following the first interval.

8. The power circuitry as recited in claim 7, wherein the control circuitry is further configured to control the gate of the power transistor independent of the charge pump to at least partially turn on the power transistor after the second interval following the first interval.

9. The power circuitry as recited in claim 7, wherein the gate of the power transistor is controlled using the output of the charge pump to at least partially turn on the power transistor after the second interval following the first interval.

10. A method of protecting an electronic device during an overvoltage event, the method comprising:
limiting an input voltage of a charge pump using a voltage clamp;
ramping a control voltage applied to a gate of a power transistor using an output of the charge pump during a power-on operation, wherein the power transistor applies a supply voltage to a load; and
when the supply voltage exceeds a threshold thereby activating the voltage clamp, limiting a current flowing through the voltage clamp.

11. The method as recited in claim 10, wherein the load comprises a voltage regulator.

12. The method as recited in claim 11, wherein after the power transistor at least partially turns on during the power-on operation, the voltage regulator generates a regulated voltage configured to power the charge pump.

13. The method as recited in claim 12, wherein the charge pump further turns on the power transistor in response to the regulated voltage.

14. The method as recited in claim 10, further comprising controlling the gate of the power transistor to limit a maximum voltage applied to the load when the supply voltage exceeds the threshold.

15. The method as recited in claim 14, wherein when the supply voltage exceeds the threshold for a first interval, further comprising controlling the gate of the power transistor to substantially turn off the power transistor.

16. The method as recited in claim 15, further comprising controlling the gate of the power transistor to at least partially turn on the power transistor after a second interval following the first interval.

17. The method as recited in claim 16, further comprising controlling the gate of the power transistor independent of the charge pump to at least partially turn on the power transistor after the second interval following the first interval.

18. The method as recited in claim 16, further comprising controlling the gate of the power transistor using the output of the charge pump to at least partially turn on the power transistor after the second interval following the first interval.

19. Power circuitry for protecting an electronic device during an overvoltage event, the power circuitry comprising:
a voltage clamp in parallel with a charge pump, wherein the voltage clamp limits an input voltage of the charge pump;
a current limiting resistor coupling a supply voltage to the voltage clamp and to the charge pump; and
a power transistor configured to couple the supply voltage to a load comprising a voltage regulator, wherein:
a gate of the power transistor is controlled by an output of the charge pump during a power-on operation;
when the supply voltage exceeds a threshold thereby activating the voltage clamp, the current limiting resistor limits a current flowing through the voltage clamp; and
after the power transistor at least partially turns on during the power-on operation, the voltage regulator generates a regulated voltage configured to power the charge pump.

20. The power circuitry as recited in claim 19, wherein the charge pump further turns on the power transistor in response to the regulated voltage.

21. Power circuitry for protecting an electronic device during an overvoltage event, the power circuitry comprising:
a voltage clamp in parallel with a charge pump, wherein the voltage clamp limits an input voltage of the charge pump;
a current limiting resistor coupling a supply voltage to the voltage clamp and to the charge pump;
a power transistor configured to couple the supply voltage to a load; and
control circuitry configured to control a gate of the power transistor to limit a maximum voltage applied to the load when the supply voltage exceeds a threshold;
wherein:
the gate of the power transistor is controlled by an output of the charge pump during a power-on operation;
when the supply voltage exceeds the threshold thereby activating the voltage clamp, the current limiting resistor limits a current flowing through the voltage clamp; and
when the supply voltage exceeds the threshold for a first interval, the control circuitry is further configured to control the gate of the power transistor to substantially turn off the power transistor.

22. The power circuitry as recited in claim 21, wherein the gate of the power transistor is controlled to at least partially turn on the power transistor after a second interval following the first interval.

23. The power circuitry as recited in claim 22, wherein the control circuitry is further configured to control the gate of the power transistor independent of the charge pump to at least partially turn on the power transistor after the second interval following the first interval.

24. The power circuitry as recited in claim 22, wherein the gate of the power transistor is controlled using the output of the charge pump to at least partially turn on the power transistor after the second interval following the first interval.

25. A method of protecting an electronic device during an overvoltage event, the method comprising:
   limiting an input voltage of a charge pump using a voltage clamp;
   controlling a gate of a power transistor using an output of the charge pump during a power-on operation, wherein the power transistor applies a supply voltage to a load comprising a voltage regulator; and
   when the supply voltage exceeds a threshold thereby activating the voltage clamp, limiting a current flowing through the voltage clamp;
   wherein after the power transistor at least partially turns on during the power-on operation, the voltage regulator generates a regulated voltage configured to power the charge pump.

26. The method as recited in claim 25, wherein the charge pump further turns on the power transistor in response to the regulated voltage.

27. A method of protecting an electronic device during an overvoltage event, the method comprising:
   limiting an input voltage of a charge pump using a voltage clamp;
   controlling a gate of a power transistor using an output of the charge pump during a power-on operation, wherein the power transistor applies a supply voltage to a load;
   when the supply voltage exceeds a threshold thereby activating the voltage clamp, limiting a current flowing through the voltage clamp;
   controlling the gate of the power transistor to limit a maximum voltage applied to the load when the supply voltage exceeds the threshold; and
   when the supply voltage exceeds the threshold for a first interval, controlling the gate of the power transistor to substantially turn off the power transistor.

28. The method as recited in claim 27, further comprising controlling the gate of the power transistor to at least partially turn on the power transistor after a second interval following the first interval.

29. The method as recited in claim 28, further comprising controlling the gate of the power transistor independent of the charge pump to at least partially turn on the power transistor after the second interval following the first interval.

30. The method as recited in claim 28, further comprising controlling the gate of the power transistor using the output of the charge pump to at least partially turn on the power transistor after the second interval following the first interval.

* * * * *